United States Patent [19]

Nasu et al.

[11] Patent Number: 5,045,412

[45] Date of Patent: * Sep. 3, 1991

[54] PERPENDICULAR MAGNETIC STORAGE MEDIUM

[75] Inventors: Shogo Nasu, Kobe; Koji Saiki, Toyonaka, both of Japan

[73] Assignee: Kanegafuchi Kagaku Kogyo Kabushiki Kaisha, Osaka, Japan

[*] Notice: The portion of the term of this patent subsequent to Jan. 10, 2006 has been disclaimed.

[21] Appl. No.: 327,456

[22] Filed: Mar. 22, 1989

[30] Foreign Application Priority Data

Mar. 29, 1988 [JP] Japan .................................. 63-77738

[51] Int. Cl.⁵ .............................................. G11B 23/00
[52] U.S. Cl. ...................................... 428/694; 428/900
[58] Field of Search ........................ 428/694, 900, 611

[56] References Cited

U.S. PATENT DOCUMENTS 4,362,767 12/1982 Nouchi et al. ...................... 428/900
4,726,988 2/1988 Oka et al. ............................ 428/695
4,797,330 1/1989 Nasu .................................... 428/694

FOREIGN PATENT DOCUMENTS 0122030 10/1984 European Pat. Off. .

Primary Examiner—Paul J. Thibodeau
Attorney, Agent, or Firm—Armstrong, Nikaido, Marmelstein, Kubovcik & Murray

[57] ABSTRACT

A perpendicular magnetic storage medium in which a perpendicular magnetic anisotropic film having an easy magnetization axis perpendicular to the plane thereof is formed on a substrate, wherein the perpendicular magnetic anisotropic film is a film of a sub-oxide of Fe-Co alloy, the sub-oxide has a half-value width not less than 0.7 degrees with respect to a diffracted X-ray peak caused by oxide phase observed in X-ray diffraction spectrum, and saturation magnetization in terms of $4\pi Ms$ of the film is within a range from 6,000 Gauss to 13,000 Gauss. The medium has high recording/reproducing sensitivity, high recording density and high wear resistance, and can be produced easily and economically at a low substrate temperature.

1 Claim, 4 Drawing Sheets

PERPENDICULAR MAGNETIC STORAGE MEDIUM

BACKGROUND OF THE INVENTION

The present invention relates to a perpendicular magnetic storage medium and more particularly to a perpendicular magnetic storage medium used in a form of a card, a tape, a disc or the like, wherein there is formed a perpendicular magnetic anisotropic film made of a sub-oxide of Fe-Co alloy which is suitable for high density recording.

Hitherto, a perpendicular magnetic storage medium is effectively used for a high-density magnetic storage. A magnetic storage medium used for such a purpose utilizes a magnetic thin film which has an easy magnetization axis being perpendicular to the plane of the film. As a magnetic film for the above use, there have been used or researched a thin film of Co-Cr (Co-Cr alloy), $Fe_3O_4$ or $O_s$-$\gamma Fe_2O_3$ produced by sputtering method or vacuum deposition (vacuum evaporation) method, a thin film of barium-ferrite produced by coating method or sputtering method, and the like.

However, the above conventional perpendicular magnetic storage mediums have drawbacks as described hereinafter.

The magnetic thin film of Co-Cr alloy used in the above conventional medium is required to have a structure close to a single crystal. Therefore, a substrate, on which the magnetic thin film is formed, should be heated to higher than 100° C. or frequently higher than 200° C. during the deposition thereon. This requires the use of a heat-resistant substrate and consequently increases the production cost. Further, a film of metal has an intrinsic drawback that it is apt to be worn out.

The magnetic thin film of the metal oxide such as $Fe_3O_4$ and $O_s$-$\gamma Fe_2O_3$ is hard and has a high wear resistance. But, since a substrate for the magnetic thin film of $Fe_3O_4$ or $O_s$-$\gamma Fe_2O_3$ is also required to be heated to higher than 250° C. during the deposition thereon, the production cost is increased like that of the above Co-Cr alloy film. Further, the metal oxide such as $O_s$-$\gamma Fe_2O_3$ or the like used for the magnetic thin film is sometimes required to be subjected to a reduction process. Still further, the perpendicular magnetic storage medium using these magnetic thin films of the metal oxide has a drawback in that the saturation magnetization (Ms) is low and therefore there cannot be obtained media having high recording and reproducing sensitivity.

The thin film of barium-ferrite obtained by a coating method for the perpendicular magnetic storage medium requires providing barium-ferrite powder having a uniform particle diameter of about 0.1 μm for the film forming thereof. Accordingly, the production cost is increased. Further, because a binder is required to be added in order to form a film, the content of barium-ferrite in the film is lowered due to such addition. This causes a low saturation magnetization (Ms) of the magnetic thin film, and consequently lowers the performance of the magnetic storage medium.

The thin film of barium-ferrite obtained by a sputtering method has a higher saturation magnetization than the film by coating method, but a substrate therefor should be heated to about 500° C. Accordingly, the substrate must be highly heat resistant, and the use of an inexpensive plastic substrate is not allowed.

As an effective means to remove the above drawbacks, there has been proposed a perpendicular magnetic anisotropic film of a sub-oxide of Fe or a sub-oxide of Fe-Co alloy (as disclosed in Japanese Patent Publication No. 162622/1984 or No. 198707/1984, for example). In accordance with such means, a perpendicular magnetic anisotropic film can be formed at a low substrate temperature, and therefore a low heat resistant but inexpensive film can be used as a substrate. In addition, the proposed perpendicular magnetic anisotropic film has a high perpendicular magnetic anisotropy, and accordingly a perpendicular magnetic anisotropic film having a high saturation magnetization (MS) can be obtained. Further, a perpendicular magnetic anisotropic film of such a sub-oxide has a high wear resistance, and also has a high flexibility by virtue of metal contained therein.

However, the recording and reproducing sensitivity and the recording density of the above perpendicular magnetic anisotropic film of a sub oxide of Fe or a sub-oxide of Fe-Co alloy is not so high as, for example, a perpendicular magnetic anisotropic film of Co-Cr alloy. That is, the above perpendicular magnetic anisotropic film of a sub-oxide of Fe or a sub-oxide of Fe-Co presents a normalized output (V) no higher than about 20 μ $V_{o-p}$/(m/sec)/mm/turn when recording/reproducing is conducted using a Mn-Zn ferrite ring head, while a perpendicular magnetic anisotropic film of Co-Cr alloy presents a normalized output (V) of 40 to 50 μ $V_{o-p}$/(m/sec)/mm/turn under the same condition. The above normalized output (V) is defined as a quotient obtained by dividing the reproducing output voltage in μ $V_{o-p}$ by the relative head speed in m/sec, the track width in mm and the number of windings in turn.

The present invention was made to solve the above mentioned problem existing in the conventional perpendicular magnetic anisotropic film of a sub oxide of Fe-Co that the recording and reproducing sensitivity thereof is not satisfactory, and an object of the present invention is to provide a perpendicular magnetic storage medium having a perpendicular magnetic anisotropic film, which can be produced easily and economically at a low substrate temperature and which has high wear resistance, and also which has high recording and reproducing sensitivity and high recording density enough to present a normalized output (V) not lower than about 40 μ $V_{o-p}$/(m/sec)/mm/turn under the aforementioned condition.

SUMMARY OF THE INVENTION

In accordance with the present invention, there is provided a perpendicular magnetic storage medium in which a perpendicular magnetic anisotropic film having an easy magnetization axis perpendicular to the plane thereof is formed on a substrate, wherein the perpendicular magnetic anisotropic film is a film of a sub-oxide of Fe-Co alloy, the sub-oxide has a half-value width not less than 0.7 degrees with respect to a diffracted X-ray peak caused by oxide phase (a peak caused by a lattice plane of miller index (200) in NaCl-type FeO) observed in X-ray diffraction spectrum, and saturation magnetization in terms of $4\pi Ms$ of the film is within a range from 6,000 Gauss to 13,000 Gauss. The medium has an advantageous feature of high sensitivity particularly in recording and reproducing using a ring head.

DETAILED DESCRIPTION

With respect to magnetic properties of a perpendicular magnetic anisotropic film (i.e., a magnetic film having a magnetic anisotropy which is perpendicular to a plane containing said film) used for a perpendicular magnetic storage device in general, important properties are saturation magnetization (Ms), anisotropic magnetic field (Hk) and perpendicular coercive force (Hcl). In order to obtain a perpendicular magnetic storage medium which provides a satisfactory performance, a perpendicular magnetic anisotropic film therefor is required to have particular magnetic properties, i.e. saturation magnetization (Ms) of 500 emu (6,000 Gauss in terms of $4\pi Ms$) or higher, anisotropic magnetic field (Hk) of 3 kOe or higher, and perpendicular coercive force (Hcl) of 200 Oe or higher.

Figure 1:
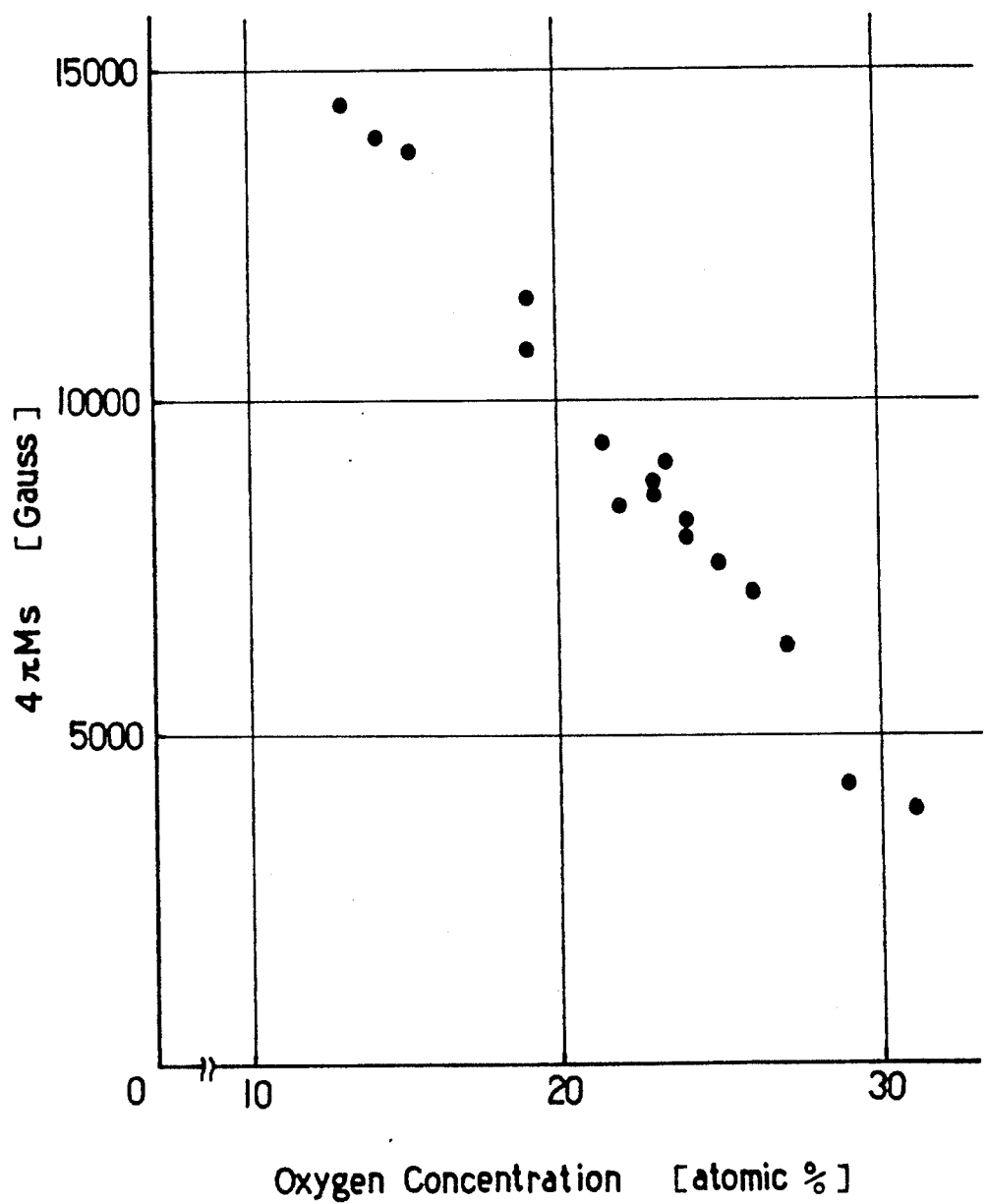
FIG. 1 is a graph showing a relationship between oxygen concentration measured by XPS method and saturation magnetization in terms of $4\pi Ms$.

Saturation magnetization ((Ms) or ($4\pi Ms$)) of a perpendicular magnetic anisotropic film of a sub-oxide of Fe-Co alloy employed in the present invention has an almost linear relationship with oxygen concentration in the film, independently of the composition of Fe-Co alloy as far as the amount of Co in Fe-Co alloy is within a range from 20 atomic % to 80 atomic %. FIG. 1 shows the relationship between an oxygen concentration measured by X-ray photoelectron spectroscopy (XPS) method and a saturation magnetization ($4\pi Ms$). With regard to the oxygen concentration capable of providing enough saturation magnetization, it is known from FIG. 1 that an oxygen concentration measured by XPS method is required to be equal to or lower than about 27 atomic % in order to provide saturation magnetization ($4\pi Ms$) of 6,000 Gauss or higher.

It should be noted that oxygen concentration values measured by different measuring methods are not always consistent with each other, or in other words that different measuring methods sometimes give different values. However, as demonstrated in FIG. 1, oxygen concentration measured by X-ray photoelectron spectroscopy (XPS) method and saturation magnetization ($4\pi Ms$) have an almost linear relationship. Therefore, a value of $4\pi Ms$ is used in this specification as a parameter representing oxygen concentration in consideration of high measuring accuracy and stable reproducibility of $4\pi Ms$.

With regard to anisotropic magnetic field (Hk) and perpendicular coercive force (Hcl), an oxygen concentration within a range wherein a value of $4\pi Ms$ is equal to or lower than 13,000 Gauss (oxygen concentration measured by XPS method is equal to or higher than about 18 atomic %) and preferably within a range wherein a value of $4\pi Ms$ is equal to or lower than 12,000 Gauss provides an anisotropic magnetic field (Hk) equal to or higher than about 3 kOe and a perpendicular coercive force (Hcl) equal to or higher than about 200 Oe, independently of the composition of Fe-Co alloy as far as the amount of Co in Fe-Co alloy is within a range from 20 atomic % to 80 atomic %.

Figure 2:
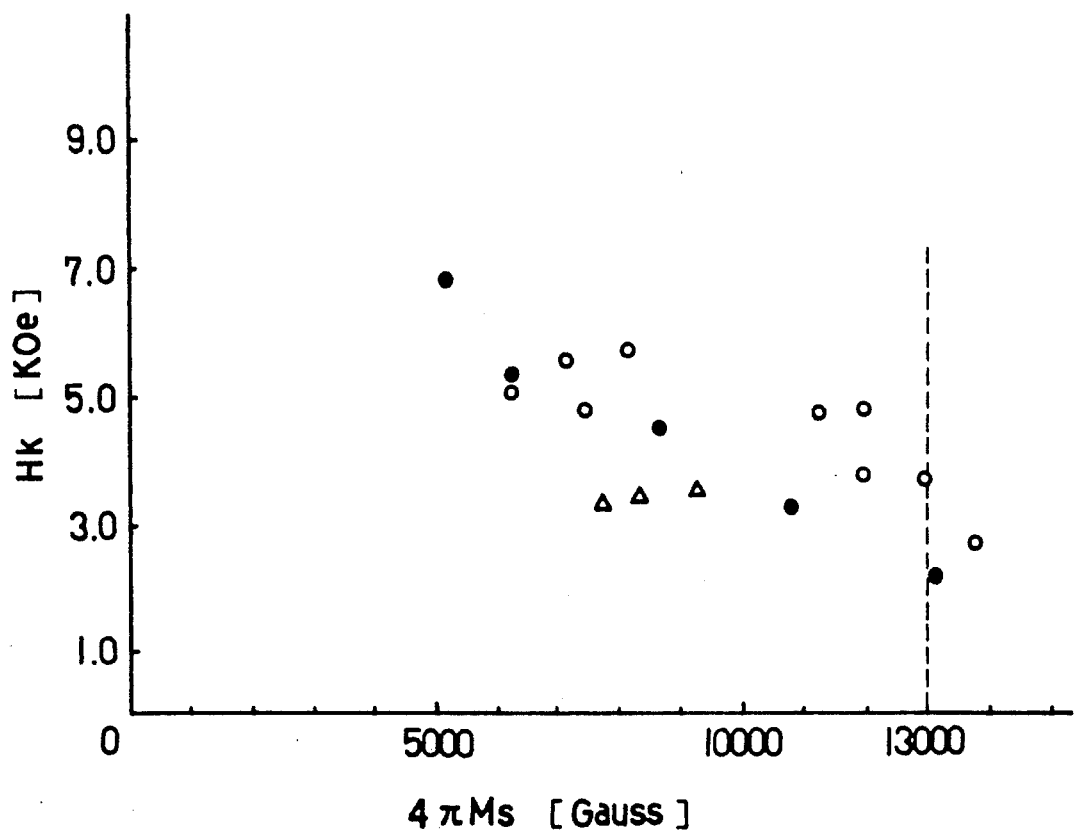
FIG. 2 is a graph showing a relationship between saturation magnetization ($4\pi Ms$) and anisotropic magnetic field (Hk)
Figure 3:
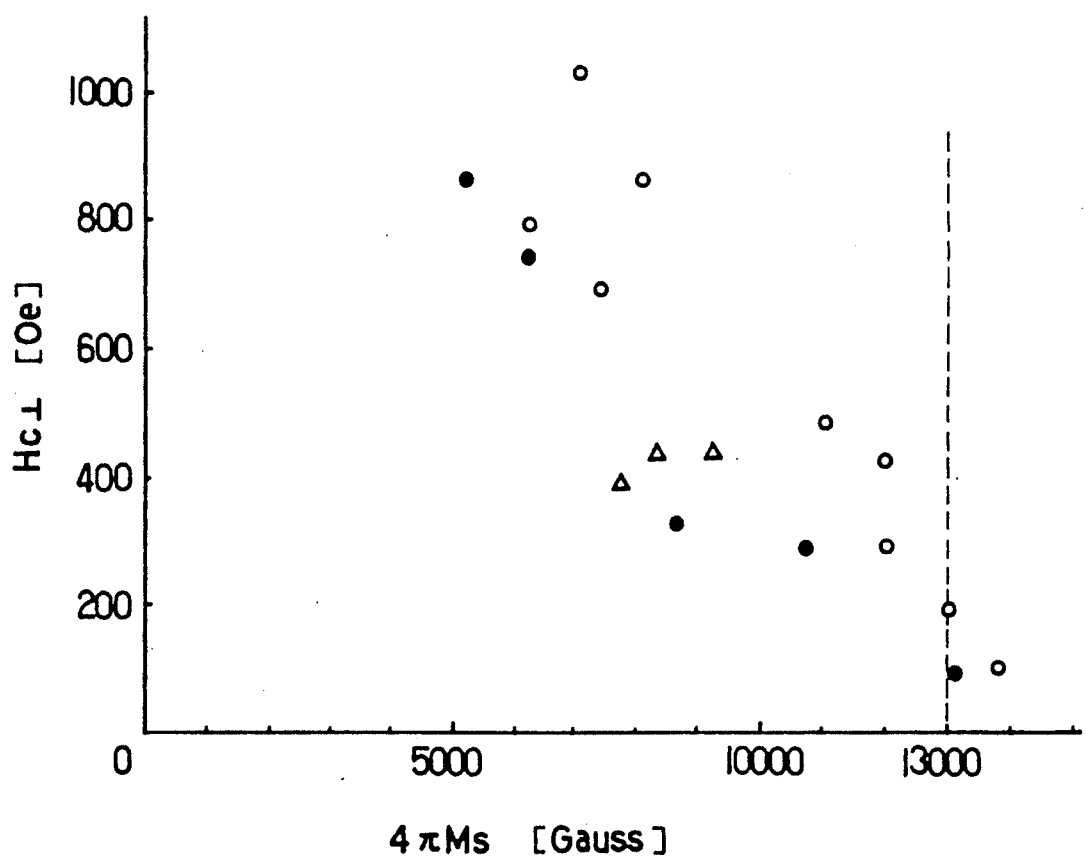
FIG. 3 is a graph showing a relationship between saturation magnetization ($4\pi Ms$) and perpendicular coercive force (Hcl)

FIG. 2 shows the relationship between saturation magnetization ($4\pi Ms$) and anisotropic magnetic field (Hk), and FIG. 3 shows the relationship between saturation magnetization ($4\pi Ms$) and perpendicular coercive force. In FIGS. 2 and 3, a hollow round dot represents a sample wherein the atomic ratio Co/(Fe-Co) is 0.40, a solid round dot represents a sample wherein the atomic ratio Co/(Fe+Co) is 0.60, and a hollow triangular dot represents a sample wherein the atomic ratio Co/(Fe+Co) is within a range from 0.70 to 0.80.

Thus, a perpendicular magnetic anisotropic film of a sub-oxide of Fe-Co alloy of which oxygen concentration in the film measured by the XPS method is within a range from 18 atomic % to 27 atomic %, that is saturation magnetization ($4\pi Ms$) is within a range from 6,000 Gauss to 13,000 Gauss provides an anisotropic magnetic field (Hk) of about 3 kOe or higher and a perpendicular coercive force (Hcl) of about 200 Oe or higher, independently of the composition of Fe-Co alloy as far as the amount of Co in Fe-Co alloy is within a range from 20 atomic % to 80 atomic %. Such magnetic properties are comparable to those of a perpendicular magnetic anisotropic film of Co-Cr alloy.

However, recording and reproducing sensitivity of a perpendicular magnetic storage medium using the above-mentioned perpendicular magnetic anisotropic film of Fe-Co alloy sub-oxide is not always so high as that of a perpendicular magnetic storage medium using a perpendicular magnetic anisotropic film of Co-Cr alloy.

Various studies were conducted with regard to the recording and reproducing sensitivity of a perpendicular magnetic storage medium which utilizes a perpendicular magnetic anisotropic film of a Fe-Co alloy sub-oxide as discussed above. As a result of the studies, it was found that the recording and reproducing sensitivity is governed not only by the magnetic properties such as saturation magnetization ($4\pi Ms$), anisotropic magnetic field (Hk), perpendicular coercive force (Hcl) and the like but also by the microscopic structure of the perpendicular magnetic film, and thus the present invention was made. That is, lower crystallinity of an oxide phase in a perpendicular magnetic anisotropic film of Fe-Co alloy sub-oxide formed on a substrate provides higher recording and reproducing sensitivity. Particularly, higher recording and reproducing sensitivity is attained by the perpendicular magnetic anisotropic film wherein the sub-oxide has a half-value width not less than 0.7 degrees, preferably not less than 0.8 degrees, with respect to a diffracted X-ray peak caused by oxide phase, namely a peak caused by a latice plane of miller index (200) in NaCl-type FeO, observed in X-ray diffraction spectrum. Most desirably, the highest recording and reproducing sensitivity is provided if the aforementioned half value width is infinity ($\infty$), that is, no substantial diffraction peak is observed and the oxide phase is amorphous.

However, it should be noted that as mentioned previously the film having an oxygen concentration lower than 6,000 Gauss or higher than 13,000 Gauss in terms of $4\pi Ms$ is undesirable because it is inferior in magnetic properties and in recording and reproducing sensitivity.

Figure 4:
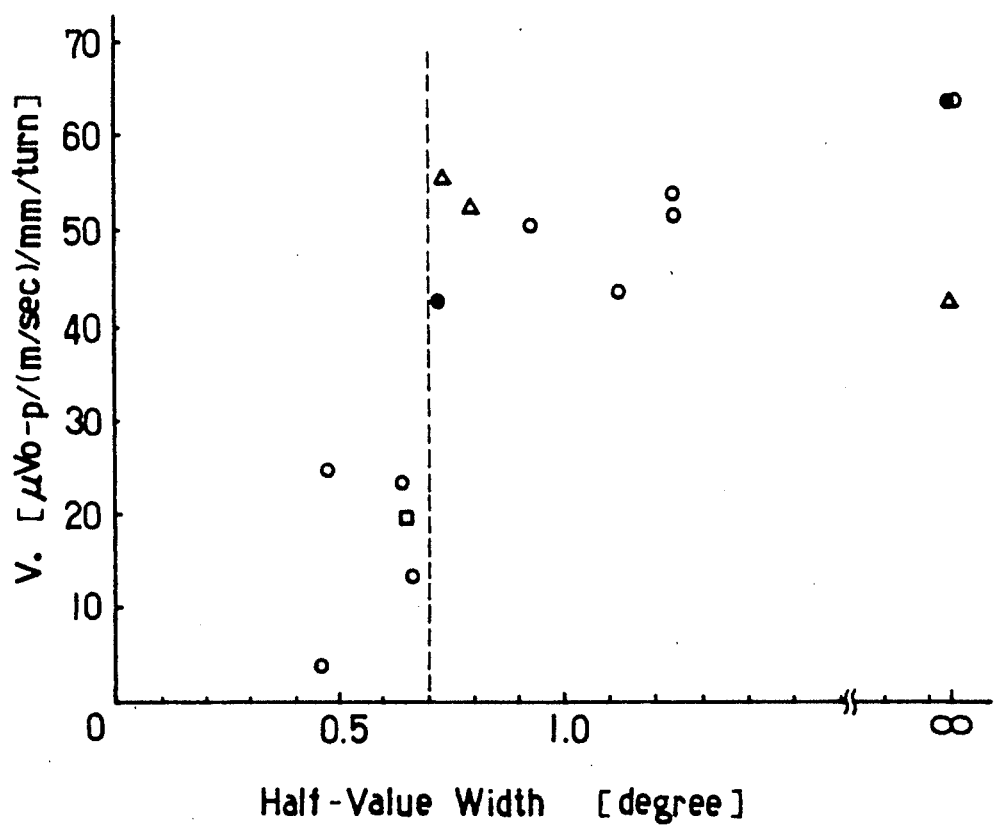
FIG. 4 is a graph showing a relationship between normalized reproducing output (V) and half-value width with respect to a diffracted X-ray peak observed in X-ray diffraction spectrum.

FIG. 4 is a graph showing the relationship between normalized output (V) and half-value width with respect to a diffracted X-ray peak caused by a latice plane of miller index (200) in NaCl-type FeO of oxide phase observed in X-ray diffraction spectrum, concerning a perpendicular magnetic storage medium comprising a perpendicular magnetic anisotropic film of Fe-Co alloy sub-oxide wherein the Co content in Fe-Co alloy is within a range from 20 atomic % to 80 atomic % and the oxygen concentration is within a range from 6,000 Gauss to 13,000 Gauss in terms of $4\pi Ms$. The above-mentioned normalized output (V) is a value at a linear recording density of 25.4 KFRI in recording/reproducing conducted using a Mn-Zn ferrite ring head. In FIG. 4, a hollow square dot represents a sample wherein the atomic ratio Co/(Fe+Co) is 0.2, a hollow round dot represents a sample wherein the atomic ratio Co/(Fe+Co) is 0.4, a solid round dot represents a sample wherein the atomic ratio Co/(Fe+Co) is 0.6, and a hollow triangular dot represents a sample wherein the atomic ratio Co/(Fe+Co) is within a range from 0.7 to 0.8.

In the X-ray diffraction analysis, there was used $K\alpha$ beam of Cu target. With respect to slits, there were employed a divergence slit of 1 degree, a receiving slit of 0.3 mm, a scattering slit of 1 degree and a monochromator receiving slit of 0.45 mm.

It is found from FIG. 4 that the normalized output (V) not lower than 40 $\mu$ $V_{o-p}$/(m/sec)/mm/turn is presented by a sample wherein a half-value width with respect to a diffrated X-ray diffraction spectrum is not less than 0.7 degrees.

Such sub-oxide having low crystallinity of oxide phase is obtainable by appropriately selecting the composition of Fe-Co alloy and the film forming condition.

With regard to the composition of Fe Co alloy, film formation of sub-oxide having low crystallinity of oxide phase can be carried out when the amount of Co in Fe-Co alloy is not lower than 30 atomic %, preferably not lower than 40 atomic %, more preferably not lower than 50 atomic %. Lower Co content tends to enhance the crystal grain growth, and it is difficult to obtain sub-oxide having low crystallinity of oxide phase when the amount of Co in Fe-Co alloy is lower than 30 atomic %. Therefore, the Co amount lower than 30 atomic % is undesirable.

On the other hand, higher Co content tends to lower the magnetic properties. Therefore, the amount of Co in Fe-Co alloy is preferably not higher than 80 atomic %, more preferably not higher than 70 atomic %.

In addition, it should be reminded again that as mentioned previously oxygen concentration lower than 6,000 Gauss or higher than 13,000 Gauss in terms of $4\pi Ms$ is undesirable because it lowers the magnetic properties.

The above descriptions are summarized here. The normalized output (V) not lower than 40 $\mu$ $V_{o-p}$/(m/sec)/mm/turn is obtainable when the composition of Fe-Co alloy expressed in the amount of Co in Fe-Co alloy is within a range from 30 atomic % to 80 atomic %, preferably within a range from 40 atomic % to 70 atomic %, more preferably within a range from 50 atomic % to 70 atomic %, and oxygen concentration in terms of saturation magnetization $4\pi Ms$ is within a range from 6,000 Gauss to 13,000 Gauss, preferably within a range from 6,000 Gauss to 12,000 Gauss, and simultaneously the sub-oxide has low crystallinity of oxide phase and has a half-value width not less than 0.7 degrees, preferably not less than 0.8 degrees, with respect to a diffracted X-ray peak caused by oxide phase observed in X-ray diffraction spectrum.

Besides, with regard to the recording and reproducing sensitivity, the recording density is important as well as the above normalized output (V). As a parameter for the recording density, there is used $D_{50}$ which is defined (in the relationship between recording density and reproducing output wherein higher recording density results in lower reproducing output) as the recording density resulting in the reproducing output of $V_o/2$ where Vo means the reproducing output at low recording density. As far as the aforementioned perpendicular magnetic anisotropic film of Fe-Co alloy sub oxide, the parameter $D_{50}$ is an almost proportional to anisotropic field (Hk) independently of the composition of Fe-Co alloy, and satisfactorily high recording density is presented if anisotropic field (Hk) is not lower than 3.0 kOe.

There is explained next the film forming condition.

The perpendicular magnetic anisotropic film in the present invention can be formed by means of deposition method in a wide sense, for example a sputtering method. However, film forming by means of rf-magnetron sputtering method is explained hereinafter for the purpose of an exemplification.

With regard to a substrate used in the present invention, there can be used for example a metal plate of aluminum, stainless steel or the like; or a plastic plate, sheet or film of polyimide, polyester or the like. The substrate used in the present invention is not limited to these example, and any substrate having a softening point of about 50° C. or higher and a thickness of about 10 $\mu$m to 10 mm can be used in the present invention.

Concerning the film forming condition, the substrate temperature and the film forming rate are especially important.

With respect to the substrate temperature, although the aforementioned film can be formed at 0° C. to 200° C., an effective way to obtain sub-oxide having small crystal grain diameter of oxide phase is to employ a substrate temperature as low as possible. For example, a substrate holder can be cooled with cooling water as a usual means, or alternatively the substrate temperature can be made lower than the room temperature with cooling medium of a temperature lower than the room temperature as a much effective means.

As to the film forming rate which can be controlled by sputtering power, higher film forming rate is effective to obtain sub-oxide having small crystal grain diameter of oxide phase. As far as our study with the film forming rate being selected from a range of 10 Å/sec to 30 Å/sec is concerned, higher film forming rate results in larger half-value width. Although the upper limit of the film forming rate, i.e. sputtering rate, is governed by cooling rate for the substrate, electrical power source capacity and the like, higher sputtering rate is preferable within such limitations.

Oxygen concentration in the perpendicular magnetic anisotropic film in the present invention and accordingly saturation magnetization (Ms or $4\pi Ms$) thereof is controlled by oxygen gas pressure and the film forming rate in the sputtering operation. Appropriate oxygen gas pressure cannot be expressed as a specific value because it varies depending on used apparatuses, but as far as our embodiments a preferable range was from $1\times10^{-4}$ Torr to $5\times10^{-3}$ Torr In our embodiments, oxygen gas pressure lower than $1\times10^{-4}$ Torr was apt to result in insufficient oxygen content, large saturation magnetization ($4\pi Ms$) more than 13,000 Gauss and consequently low perpendicular anisotropy, and oxygen gas pressure higher than $5\times10^{-3}$ Torr was apt to result in excess oxygen content and small saturation magnetization ($4\pi Ms$) less than 6,000 Gauss.

Appropriate argon gas pressure also cannot be expressed as a specific value, but as far as our embodiments a preferable range was from $1\times10^{-3}$ Torr to $1\times10^{-2}$ Torr and a more preferable range was from $1\times10^{-3}$ Torr to $5\times10^{-3}$ Torr. In our embodiments, argon gas pressure lower than $1\times10^{-3}$ Torr was apt to result in unstable electric discharge, and argon gas pressure higher than $1\times10^{-2}$ Torr was apt to result in small anisotropic field (Hk).

In addition, a film forming rate not lower than 10 Å/sec is desirable because of an economical reason.

With respect to the thickness of the film of sub-oxide, there is no particular limitation. However, if a ring head is used, it is preferable to limit the thickness to a value approximately equal to the gap length.

Next, embodiments of the present invention are explained concretely.

EXAMPLES 1 TO 10 AND COMPARATIVE EXAMPLES 1 TO 8

Using a rf-magnetron sputtering device, perpendicular magnetic anisotropic films of sub oxides of Fe-Co alloy were formed on polyimide substrate having a thickness of 50 μm. Targets used were two kinds of Fe-Co alloy targets each having 6 inch diameter and 1 mm thickness wherein Co content (Co/(Fe+Co)) were 40 atomic % and 60 atomic % and composite targets comprising the above Fe-Co alloy plate and Co chips being placed thereon. In forming a sample having Co content (Co/((Fe+Co)) higher than 60 atomic %, Co content was controlled by changing the number of Co chips to be placed on Fe-Co alloy plate.

The distance between the substrate and the target was 7.2 cm and argon gas pressure was $3\times10^{-3}$ Torr. With regard to the substrate temperature, for some example a substrate temperature of 7° C. or 30° C. was employed by means of forced-cooling and for other example a substrate temperature of 100° C or 150° C was employed by means of heating. In addition, oxygen concentration and accordingly saturation magnetization ($4\pi Ms$) were controlled by changing the sputtering power and oxygen gas pressure.

The perpendicular magnetic anisotropic films of Fe-Co alloy sub-oxides prepared in the aforementioned manner were subjected to measurements of the composition of Fe-Co alloy, oxygen concentration, magnetic properties, microscopic structure of film and recording and reproducing sensitivity. Table 1 shows results of these measurements.

The ratio of the number of Co atoms to the total number of Fe atoms and Co atoms was measured by X-ray microanalyzer (XMA) method, and the oxygen concentration was measured by X-ray photoelectron spectroscopy (XPS) method.

In the measurement of magnetic properties of each sample, after the magnetic hysteresis curve was obtained by a vibrating-sample-magnetometer, magnetic anisotropic energy (Ku) was first obtained by area calculation based on the magnetic hysteresis curve and then anisotropic magnetic field (Hk) was calculated based on the correlation $Hk=2Ku/Ms$.

The microscopic construction of each film was determined by X-ray diffraction method. Wherein there was used $K\alpha$ beam of Cu target. With respect to slits, there were employed a divergence slit of 1 degree, a receiving slit of 0.3 mm, a scattering slit of 1 degree and a monochromator receiving slit of 0.45 mm.

The recording and reproducing characteristics were measured and evaluated using a floppy disk tester with necessary measuring equipment. There was employed a Mn-Zn ferrite ring head for video tape recorder use, which had a gap length of 0.35 μm, a truck width of 35 μm and a coil turns of 20. The driving speed was 2 m/sec.

TABLE 1

| No. | Substrate Temperature (°C.) | Film Thickness (Å) | Composition $[(Fe_{1-x}Co_x)_{1-y}O_y]$ | | | Magnetic Properties | | | X-ray Diffraction Half-Value Width of Oxide Phase (°) | Recording/ Reproducing Characteristics | |
|---|---|---|---|---|---|---|---|---|---|---|---|
| | | | Fe (1 − x) | Co (x) | O (y) | $4\pi$ Ms (Gauss) | Hk (kOe) | $HC\perp$ (Oe) | | V | $D_{50}$ |
| Ex. | | | | | | | | | | | |
| 1 | 30 | 3720 | 0.60 | 0.40 | 0.18 | 12000 | 4.8 | 435 | 1.13 | 44 | 62 |
| 2 | 30 | 3600 | 0.40 | 0.60 | 0.25 | 6300 | 5.4 | 750 | 0.73 | 43 | 53 |
| 3 | 30 | 3170 | 0.40 | 0.60 | 0.22 | 8700 | 4.5 | 330 | ∞ (Amorphous) | 64 | 50 |
| 4 | 30 | 2770 | 0.40 | 0.60 | 0.20 | 10800 | 3.3 | 300 | ∞ (Amorphous) | 64 | 50 |
| 5 | 30 | 3200 | 0.30 | 0.70 | 0.21 | 9300 | 3.6 | 450 | 0.80 | 53 | 50 |
| 6 | 30 | 3400 | 0.28 | 0.72 | 0.21 | 8400 | 3.5 | 450 | 0.74 | 56 | 50 |
| 7 | 30 | 3000 | 0.21 | 0.79 | 0.23 | 7800 | 3.4 | 400 | ∞ (Amorphous) | 43 | 50 |
| 8 | 7 | 3000 | 0.60 | 0.40 | 0.18 | 12000 | 3.8 | 300 | 1.25 | 54 | 54 |
| 9 | 7 | 3400 | 0.60 | 0.40 | 0.17 | 13000 | 3.7 | 200 | 1.25 | 52 | 70 |
| 10 | 100 | 3280 | 0.60 | 0.40 | 0.20 | 11040 | 4.7 | 495 | 0.94 | 51 | 52 |
| Com. Ex. | | | | | | | | | | | |
| 1 | 100 | 2780 | 0.60 | 0.40 | 0.24 | 7230 | 5.6 | 1035 | 0.67 | 14 | 43 |
| 2 | 150 | 3700 | 0.60 | 0.40 | 0.22 | 8160 | 5.8 | 870 | 0.65 | 24 | 54 |
| 3 | 30 | 2740 | 0.60 | 0.40 | 0.15 | 13800 | 2.6 | 105 | ∞ (Amorphous) | 17 | 32 |
| 4 | 30 | 2840 | 0.40 | 0.60 | 0.17 | 13100 | 2.1 | 100 | ∞ (Amorphous) | 28 | 33 |
| 5 | 30 | 3250 | 0.40 | 0.60 | 0.28 | 5250 | 6.9 | 870 | 0.50 | 21 | 57 |
| 6 | 30 | 3000 | 0.60 | 0.40 | 0.24 | 7500 | 4.8 | 700 | 0.48 | 25 | 65 |
| 7 | 30 | 2715 | 0.60 | 0.40 | 0.27 | 6300 | 5.1 | 800 | 0.46 | 4 | 60 |
| 8 | 30 | 3000 | 0.80 | 0.20 | 0.20 | 10500 | 4.8 | 575 | 0.65 | 20 | 48 |

Ex.: Example
Com. Ex.: Comparative Example

The measurement results of Examples 1 to 10 and Comparative Examples 1 to 8 in Table 1 demonstrate that the normalized output (V) not lower than 40 μ $V_{o-p}$/(m/sec)/mm/turn is attained only when the sub-oxide has a half-value width not less than 0.7 degrees with respect to a diffracted X-ray peak caused by oxide phase namely a peak caused by a latice plane of miller index (200) in NaCl-type FeO observed in X-ray diffraction spectrum or the sub-oxide is amorphous as far as X-ray diffraction is concerned, and simultaneously oxygen concentration in terms of saturation magnetization ($4\pi Ms$) is within a range from 6,000 Gauss to 13,000 Gauss.

The perpendicular magnetic storage medium of the present invention can utilize a low heat-resistant but inexpensive substrate because the film production thereof can be performed at a relatively low temperature compared with a conventional medium using a Co-Cr perpendicular magnetic anisotropic film. Therefore, a high density perpendicular magnetic storage medium can be produced at low cost.

In addition, there is utilized a sub-oxide film of Fe-Co alloy having fine structure or amorphous structure as the perpendicular magnetic anisotropic film in accordance with the present invention. By virtue of that, the perpendicular magnetic storage medium of the present invention has remarkably high recording and reproducing sensitivity comparable to the known expensive perpendicular magnetic storage medium using a thin film of Co-Cr alloy.

Further, since the perpendicular magnetic anisotropic film in the present invention has an oxidized surface, there is provided a perpendicular magnetic storage medium having a sufficient wear resistance without additional surface protection.

What is claimed is:

1. A perpendicular magnetic storage medium comprising a substrate and a magnetic anisotropic film formed on said substrate, said magnetic anisotropic film having a magnetic anisotropy in a direction perpendicular to a plane containing said magnetic anisotropic film, wherein said magnetic anisotropic film is a film of a sub-oxide of an Fe-Co alloy described by a formula $Fe_{1-x}Co_x$ (where $0.30 \leq X \leq 0.80$);

said magnetic anisotropic film having a saturation magnetization of 500 emu/cm$^3$ or higher, an anisotropic magnetic field of 3 kOe or higher, and a perpendicular coercive force of 200 Ce or higher, and containing oxygen in an atomic ratio of 18% to 27%; and said sub-oxide having a half-value width not less than 0.7 degrees with respect to a diffracted X-ray peak caused by an oxide phase observed in an X-ray diffraction spectrum.

* * * * *

UNITED STATES PATENT AND TRADEMARK OFFICE
CERTIFICATE OF CORRECTION

Page 1 of 2

PATENT NO. : 5,045,412
DATED : September 3, 1991
INVENTOR(S) : Shogo Nasu, et. al.

It is certified that error appears in the above-indentified patent and that said Letters Patent is hereby corrected as shown below:

Column 2, line 14, delete "(MS)", and insert therefor -- (Ms) --.

Column 3, line 11, delete "(Hcl)", and insert therefor -- (Hc$\perp$) --;

line 24, delete "(Hcl)", and insert therefor -- (Hc$\perp$) --;

line 62, delete "(Hcl)", and insert therefor -- (Hc$\perp$) --.

Column 4, line 2, delete "(Hcl)", and insert therefor -- (Hc$\perp$) --;

line 24, delete "(Hcl)", and insert therefor -- (Hc$\perp$) --;

line 45, delete "(Hcl)", and insert therefor -- (Hc$\perp$) --;

line 57, delete "latice", and insert therefor -- lattice --.

Column 5, line 3, delete "latcie", and insert therefor -- lattice --.

Column 6, line 66, after "Torr", insert -- . --.

(2nd occurrence).

UNITED STATES PATENT AND TRADEMARK OFFICE
CERTIFICATE OF CORRECTION

PATENT NO. : 5,045,412
DATED : September 3, 1991
INVENTOR(S) : Shogo Nasu, et. al.

It is certified that error appears in the above-indentified patent and that said Letters Patent is hereby corrected as shown below:

Column 7, line 10, after "Torr", insert -- . --; (2nd occur)
line 26, delete "a", and insert therefor -- an --.

Column 9, line 2, delete "latice", and insert therefor -- lattice --.

Column 10, line 18, delete "Ce", and insert therefor -- Oe --.

Signed and Sealed this

Nineteenth Day of October, 1993

Attest:

BRUCE LEHMAN

Attesting Officer   Commissioner of Patents and Trademarks